Patented July 19, 1949

2,476,661

UNITED STATES PATENT OFFICE 2,476,661

PRESERVING RUBBER

Edwin J. Hart, Cedar Grove, N. J., assignor to United States Rubber Company, New York, N. Y., a corporation of New Jersey No Drawing. Application February 27, 1947, Serial No. 731,415

5 Claims. (Cl. 260—809)

This invention relates to improvements in deterioration inhibitors for rubber and similar vulcanizable elasto-plastics, and to the rubbers containing same.

An object of the invention is to provide chemicals or combinations of chemicals for inhibiting the deterioration of rubber and rubber-like materials. A further object is to provide chemicals possessing the property of inhibiting fatigue failure or cracking of vulcanized rubber due to repeated flexing of the rubber after accelerated or natural aging. Other objects will be apparent from the hereinafter description.

The invention comprises broadly the incorporation in rubber of an alkyltribenzyltin of the formula $(C_6H_5CH_2)_3Sn-R$, in which R is an alkyl group having from 2 to 6 carbon atoms, and in addition thereto an antioxidant of the secondary aromatic amine type. Among these organotin compounds are tribenzyl ethyl tin, tribenzyl propyl tin, tribenzyl isopropyl tin, tribenzyl butyl tin, tribenzyl amyl tin, tribenzyl hexyl tin. The preferred tin compound is tribenzylethyltin, designated hereafter for convenience as TBET. The tin compounds show substantially no anti-cracking properties in rubber, except when used in conjunction with diarylamine type antioxidants, with which they may be regarded as having an activating or synergistic effect.

The secondary aromatic amine antioxidants used in the invention include those which are well-known as inhibitors of flex-cracking in rubber, typical examples being diphenylamine, N-phenyl-p-tolylamine, N-phenyl-beta-naphthylamine, di-beta-naphthylamine, p-methoxydiphenylamine, p,p'-dimethoxydiphenylamine, p-isopropoxydiphenylamine, p-isopropenyloxydiphenylamine, meso-dimethylacridan, N,N'-diphenyl-p-phenylenediamine, N-phenyl-N'-p-tolyl-p-phenylenediamine, N,N'-di-beta-naphthyl-p-phenylenediamine, as well as the mixtures of secondary aromatic amines resulting from the condensation of acetone or other ketones with simple diarylamines such as diphenylamine or N-phenyl-beta-naphthylamine, and the like.

The behavior of the TBET type chemical used in conjunction with secondary aromatic amine antioxidants, with phenolic antioxidants, and without auxiliary antioxidants, is given in subsequent tables.

For purposes of comparison, the compounds have been tested for antioxidant and anti-cracking properties in a tire tread mix of the following composition; parts are by weight:

| | |
|---|---|
| Rubber | 100 |
| Carbon black | 50 |
| Softener | 7 |
| Zinc oxide | 2 |
| Accelerator | 1.1 |
| Sulfur | 2.5 |

This stock, hereafter designated as Stock A, has been modified by the addition of chemicals in the amounts specified in the tables which follow. The chemicals are added on a laboratory mill heated to approximately 180° F.; slabs one-tenth inch thick were cured 35 minutes at 146° C. in a mold; and samples from the cured slabs were tensiled and/or flexed to failure. The properties of the various cured stocks in the several unaged and aged tests are illustrated by the following data:

A. That TBET shows no antioxidant power by itself is demonstrated in the following Table I:

Table I

| Stock A | Unaged Tensile | 3 Weeks Geer Aged Tensile | 120 Hr. Oxygen Aged Tensile |
|---|---|---|---|
| Blank | 3,800 | 822 | 497 |
| +TBET 1.0 | 3,500 | 619 | 513 |

B. That TBET shows but slight anti-cracking action compared to standard diarylamine type anti-oxidants in the unaged and the aged flex-cracking tests is shown by Table II:

Table II

| | Kilocycles To Failure | | |
|---|---|---|---|
| | Unaged | 5 Days Geer Aged | 6 Months Shelf Aged |
| (a) Blank (Stock A) | 66 | 21 | 46 |
| (b) Stock A+(BLE-JZF)[1] | 230 | 115 | 145 |
| (c) Stock A+(BLE-JZF)+TBET[1] (1.0) | 270 | 142 | 234 |
| (d) Stock A+TBET (1.0) | 96 | 48 | 87 |
| (e) Stock A+BLE (1.0) | 219 | | 84 |
| (f) Stock A+BLE (1.0)+TBET (1.0) | 185 | 112 | 134 |
| (g) Stock A+3,4-dihydroxy biphenyl (1.0) | 128 | 47 | 73 |
| (h) Stock A+3,4-dihydroxy biphenyl (1.0)+TBET (1.0) | 115 | 20 | 46 |

[1] Refers to average values based on four test stocks.

BLE refers to an acetone-diphenylamine condensate antioxidant.

BLE-JFZ refers to a mixture of known commercial antioxidants, composed of 1 part of BLE and 0.35 parts of N,N'-diphenyl-p-phenylenediamine.

When (a), (b), and (c) were shelf-aged for 12 months and then tested by the flex-cracking test, the results were respectively 46, 106 (average), and 180 (average) kilocycles to failure.

Tribenzylethyltin has also been found to improve the cut growth resistance of GR-S tire tread stocks. GR-S refers to rubbery 1,3-butadiene-styrene copolymer. The following result was obtained in a stock consisting of:

| | |
|---|---|
| GR-S | 100 |
| Carbon black | 50 |
| Softener | 5 |
| Zinc oxide | 5 |
| Accelerator | 1.5 |
| Sulfur | 2.0 |
| Diarylamine antioxidant | 2.0 |

This stock will hereafter be referred to as stock B.

No effect of the TBET was found in stock B for regular aging tests such as oxygen bomb, air at 212° F., or Geer oven aging. However, aged cut growth tests demonstrate the superiority of TBET stocks.

Table III

| Stock B | Cut Growth (Kilocycles to Failure) | | |
|---|---|---|---|
| | Unaged | 96 Hrs. O² | 2 Weeks Geer |
| Blank+BLE | 127 | 49 | 15 |
| BLE+TBET (1.0) | 121 | 138 | 63 |

TBET and related compounds formulated above may be used in amounts varying from 0.1 to 5.0% based on the rubber or GR-S; therewith are used from 0.1% to 5.0% based on the rubber or GR-S, of the secondary aromatic amine antioxidant.

The invention may be applied to improving the quality and resistance to fatigue failure or flex-cracking of vulcanizable rubber generally, natural or artificially-prepared, and particularly such rubbers which like india rubber show a high elasticity of 100% or more at room temperatures and substantially maintain this property on storage at room temperature.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A method of preserving a sulfur-vulcanizable rubber composition which comprises vulcanizing a rubber composition containing a small proportion of a secondary aromatic amine antioxidant and in addition a small proportion of a compound of the formula $(C_6H_5CH_2)_3Sn-R$ where R is an alkyl group having from 2 to 6 carbon atoms.

2. A method of preserving a sulfur-vulcanizable rubber composition which comprises vulcanizing a rubber composition containing a small proportion of a secondary aromatic amine antioxidant and in addition a small proportion of tribenzylethyltin.

3. A sulfur-vulcanizable rubber composition having, when vulcanized, improved resistance to fatigue failure and flex-cracking, comprising a small proportion of a secondary aromatic amine antioxidant and a small proportion of a compound of the formula $(C_6H_5CH_2)_3Sn-R$ where R is an alkyl group having from 2 to 6 carbon atoms.

4. A sulfur-vulcanizable rubber composition having, when vulcanized, improved resistance to fatigue failure and flex-cracking, comprising a small proportion of a secondary aromatic amine antioxidant and a small proportion of tribenzylethyltin.

5. A sulfur-vulcanizable rubber tire tread composition having, when vulcanized, improved resistance to fatigue failure and resistance to cracking under static and dynamic tension, said rubber composition containing a small proportion of a secondary aromatic amine antioxidant and a small proportion of a tribenzylalkyltin wherein the alkyl group has from 2 to 6 carbon atoms.

EDWIN J. HART.

REFERENCES CITED

The following references are of record in the file of this patent:

UNITED STATES PATENTS

| Number | Name | Date |
|---|---|---|
| 1,725,564 | Calcott | Aug. 20, 1929 |
| 2,112,305 | Rosen | Mar. 29, 1938 |
| 2,334,566 | Lincoln | Nov. 16, 1943 |
| 2,372,235 | Vincent | Mar. 27, 1945 |